No. 651,484. Patented June 12, 1900.
E. T. GREENFIELD.
JUNCTION BOX FOR ELECTRICAL CONDUCTORS.
(Application filed Feb. 8, 1900.)

(No Model.)

Witnesses
Edward C. Rowand
M. F. Keating

Inventor
Edwin T. Greenfield
By his Attorney
Charles J. Kintner

THE NORRIS PETERS CO., PHOTO-LITHO., WASHINGTON, D. C.

United States Patent Office.

EDWIN T. GREENFIELD, OF NEW YORK, N. Y.

JUNCTION-BOX FOR ELECTRICAL CONDUCTORS.

SPECIFICATION forming part of Letters Patent No. 651,484, dated June 12, 1900.

Application filed February 8, 1900. Serial No. 4,462. (No model.)

*To all whom it may concern:*

Be it known that I, EDWIN T. GREENFIELD, a citizen of the United States, residing at New York, borough of Manhattan, county and State of New York, have made a new and useful invention in Junction-Boxes for Electrical Conductors, of which the following is a specification.

My invention has for its object to provide means for securing the ends of inleading conduits to junction-boxes, such as are ordinarily used in the electrical wiring of buildings and especially like that disclosed in a prior patent granted to me on the 30th day of January, 1900, and bearing number 642,521.

The present improvement will be fully understood by referring to the accompanying drawings, in which—

Figure 1:
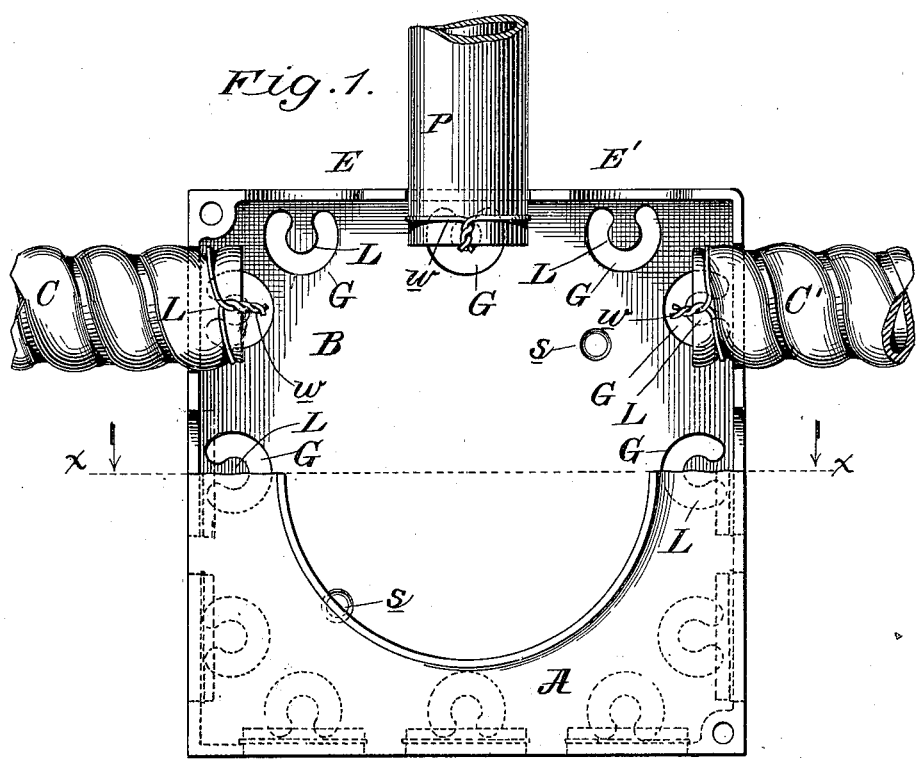
Figure 2:
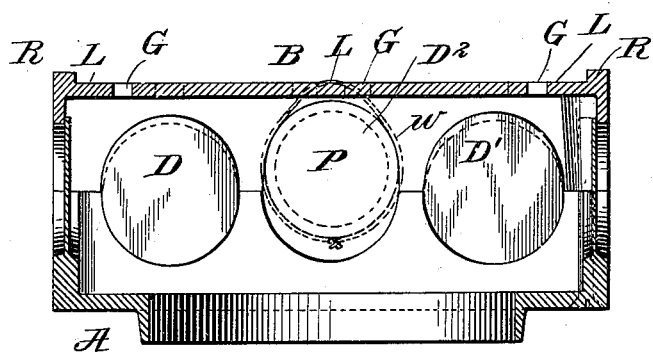

Figure 1 is a plan view of a junction-box like that disclosed in my prior patent and embodying my improvement, a part of the cover of the box being broken away to better illustrate the interior structure thereof and the means of securing the ends of inleading conduits. Fig. 2 is a transverse sectional view taken through Fig. 1 on the line $xx$ and as seen looking thereat from the top toward the bottom of the drawings in the direction of the arrows.

Referring to the drawings in detail, B represents the base, and A the lid or cover, of a two-part junction-box like that disclosed in my prior patent, the base in this instance being provided with a raised ledge or rim R, adapted to rest against the surface to which the lower part of the box is to be secured.

D D' D² represent detachable disks integral with the lid or cover A and adapted to calender with corresponding openings E E', &c., in the lower or base part of the box in the same manner as disclosed in the beforementioned patent.

C C' represent flexible inleading armored conduits like those disclosed in prior patents granted to me, and P represents an inleading gas-pipe extending into the box for the purpose of securing to it a gas-fixture.

The present improvement consists in providing a junction-box with means for quickly and easily securing the ends of inleading pipes and conduits to the box and at all times, either when it is first placed in position or after it has been in use and it is desired to connect therewith additional conduits inclosing further conductors running thereto. To this end when the lower half of the box is constructed the patterns are so made that curvilinear grooved openings are cast therein of such a nature as to leave inwardly-extending lugs or projections L L, one beneath each of the openings E E', &c., into which the ends of the gas pipes or conduits are to be inserted upon putting the structure in position for use.

It will be observed on examination of Fig. 1 that there are as many of these curvilinear openings G and corresponding lugs L as there are inlets for conduits. In putting this improved junction-box in place the base part B thereof is placed below the lower end of the gas-pipe P and the latter is lifted, so that it may enter the corresponding opening in said base, after which a small wire $w$ is passed around it and in the curvilinear openings G in such manner as to grasp or embrace the lug or projection L, the ends thereof being firmly twisted together in the manner shown, so as to unite the box and the pipe. In the same manner the inleading conduits C and C' are secured by wires $w$, twisted therearound and embracing the inwardly-extending lugs or projections L L. The corresponding disks D D' D², &c., are broken down or out of the lid A in the manner shown and described in my beforementioned patent, and it (the lid) is put in place and secured by screws in screw-holes in the corners of the base. (See Fig. 1.) When it is desired to add other conduits to the structure, the lid or cover A is removed and one of the disks D D' D² is broken out or down, as before. The end of the additional conduit is now inserted and secured to its corresponding lug L in the manner already described, after which the lid A is secured to the base B, as before. By this arrangement I provide a simple and efficient means of securing one or more conduits or gas-pipes to a junction-box and of effecting the securing of further conduits thereto after the structure is put permanently in place.

I do not limit myself to the special structure of the construction herein shown and described, as I believe it is broadly new with me to provide a junction-box with means in the nature of lugs or projections in its interior surface for enabling one to secure said junction-box and any one or more of a series of inleading conduits together in such manner that they may be quickly disconnected, if desired, or additional conduits may be added thereto when required, and this constitutes the generic feature of my novel improvement.

Having thus described my invention, what I claim, and desire to secure by Letters Patent of the United States, is—

1. A junction-box provided with one or more openings in its sides and one or more lugs or projections adjacent to said openings for securing the ends of corresponding inleading conduits thereto, substantially as described.

2. A two-part junction-box the base of which is provided with means for securing it to a wall or ceiling and openings for admitting the ends of inleading conduits; in combination with lugs or projections adjacent to said openings for securing the ends of said conduits thereto, substantially as described.

3. A two-part junction-box the base of which is provided with means for securing it to a wall or ceiling and openings for admitting the ends of inleading conduits; in combination with lugs or projections adjacent to said openings and means for securing the ends of said conduits to said lugs or projections, substantially as described.

4. A junction-box composed of two parts, one of which is provided with openings and the other with disks adapted to close said openings when the two parts of the box are put together; in combination with lugs or projections adjacent to the openings for securing the ends of inleading conduits, substantially as described.

5. A cast-metal junction-box composed of two parts, one of said parts having half-circular openings in its walls and lugs or projections for securing the ends of inleading conduits, and the other provided with integral disks corresponding to the openings and adapted to close said openings when the two parts are secured together, substantially as described.

In testimony whereof I have hereunto subscribed my name this 29th day of January, 1900.

EDWIN T. GREENFIELD.

Witnesses:
   WM. T. RUETE,
   GEO. C. DU BOIS.